June 6, 1939.  H. E. CITTELL  2,161,336
TURN SIGNAL
Filed Aug. 30, 1937  2 Sheets-Sheet 1
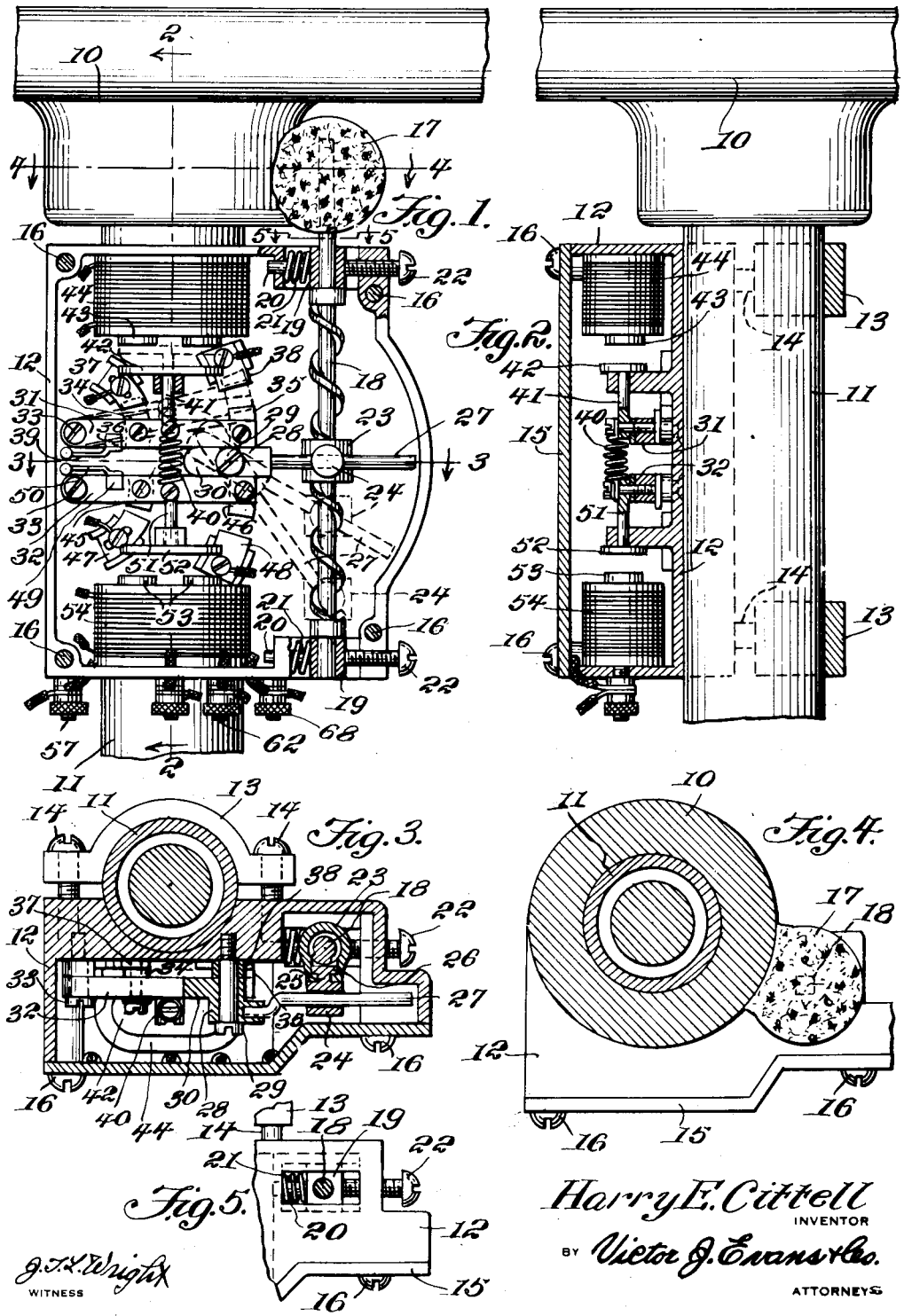
Harry E. Cittell
INVENTOR
BY Victor J. Evans & Co.
ATTORNEYS

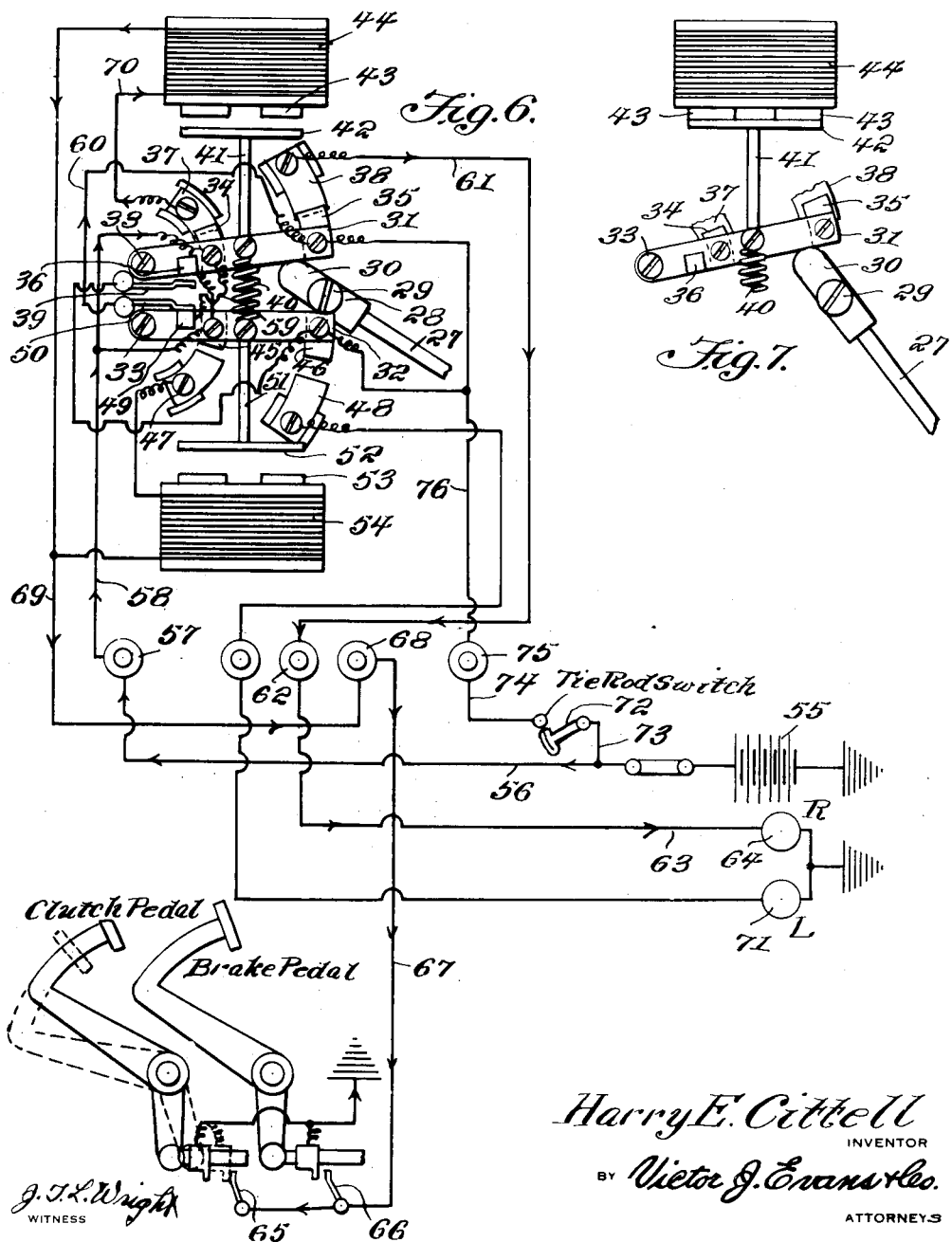

Patented June 6, 1939

2,161,336

UNITED STATES PATENT OFFICE 2,161,336

TURN SIGNAL

Harry E. Cittell, Eggertsville, N. Y.

Application August 30, 1937, Serial No. 161,653

1 Claim. (Cl. 200—59)

This invention relates to turn signals for motor vehicles and has for an object to provide a signal which will be automatically operated from the steering wheel and which will have switch contacts for the signal lamp circuits, associated with electro-magnets which may be selectively energized to energize the turn signal in advance of the intended turn.

A further object of the invention is to provide a turn signal in which the safety feature is greatly promoted inasmuch as the hands need not be moved from the steering wheel to give a signal and the feet may always remain in ready position with respect to the clutch and the brake.

A further object is to provide turn signal apparatus which will be operated as soon as pressure is applied to the clutch or to the brake pedal after the switch contacts have been closed by a slight turn of the steering wheel in the direction of the intended turn.

A further object is to provide turn signal apparatus in which a steering rod switch controls a circuit for eliminating flickering of the signal lamps when the vehicle is being maneuvered to maintain a straight course.

A further object is to provide turn signal apparatus which will be formed of a few strong simple and durable parts, which will be easy to manufacture, and which will be readily installed on used motor vehicles as well as on motor vehicles in the course of manufacture.

With the above and other objects in view the invention consists of certain novel details of construction and combinations of parts hereinafter fully described and claimed, it being understood that various modifications may be resorted to within the scope of the appended claim without departing from the spirit or sacrificing any of the advantages of the invention.

In the accompanying drawings forming part of this specification,

Figure 1 is a front elevation of turn signal apparatus constructed in accordance with the invention, the cover of the housing being removed to expose the various switch mechanisms.

Figure 2 is a longitudinal sectional view of the turn signal apparatus taken on the line 2—2 of Figure 1.

Figure 3 is a cross sectional view of the apparatus taken on the line 3—3 of Figure 1.

Figure 4 is a detail cross sectional view taken on the line 4—4 of Figure 1.

Figure 5 is a detail cross sectional view taken on the line 5—5 of Figure 1.

Figure 6 is a diagrammatic view showing the electrical connections of the various parts.

Figure 7 is a detail front elevation showing the switch actuating cam at one limit of its movement.

Referring now to the drawings in which like characters of reference designate similar parts in the various views, 10 designates the steering wheel and 11 designates a steering wheel column. The turn signal mechanism is housed in a casing 12 which is secured to the steering column by spaced clamp yokes 13 and bolts 14, as best shown in Figure 3. The casing is closed at the front by a cover plate 15 which is secured in place by screws 16.

In carrying out the invention a soft rubber ball 17 is disposed on a worm shaft 18 of steep pitch, the shaft being journaled in floating bearings 19 mounted in respective superposed bearing boxes through the instrumentality of respective stub shafts 20 upon each of which is sleeved a helical spring 21 there being a set screw 22 threaded into the box and opposing the tension of the spring. The ball 17 frictionally engages the hub of the steering wheel and by tightening or loosening the set screws 22 the radius of the ball at its point of contact with the hub will be varied to correspondingly vary the speed at which the shaft 18 is rotated.

A traveling nut 23 is disposed upon the worm shaft and upon one side of the nut a rod holder 24 is swivelly mounted by means of a neck 25 disposed in an opening in the nut and a head 26 on the end of the neck to retain the holder in place, as best shown in Figure 3.

As also best shown in Figure 3, a rod 27 is slidably fitted in the swivel holder 19. The rod is provided with a tubular bearing 28 and a pivot pin 29 is passed through the bearing and into the casing 12. A cam 30 is formed integral with the bearing and is disposed laterally thereof so as to be interposed between two superposed switch arms 31 and 32, best shown in Figures 1, 2 and 3. Both switch arms are pivoted to the casing remote from the cam as shown at 33.

The switch arm 31 is provided with a pair of spaced contacts 34 and 35 on one side thereof and with a switch contact 36 on opposite side thereof engageable respectively with stationary switch contacts 37, 38 and 39. Consequently when the cam moves the switch arm 31 upwardly against the tension of a spring 40 which connects the arm with the other switch arm 32, both contacts on the same side of the arm will be in circuit closing position while the contacts 36 and 39 on the opposite side of the arm will be in open circuit position. The purpose of this will presently appear.

The switch arm 31 is equipped with a rod 41 which carries an armature 42 on the end, in confronting engagement with the pole pieces 43 of an electro-magnet 44.

The contacts and electro-magnet construction is duplicated with respect to the companion switch arm 32. That is, there are spaced contacts 45 and 46 on one side of the arm simultaneously engageable with stationary contacts 47 and 48 when the arm is swung downward by the cam 30. The switch arm is provided on the opposite side with a contact 49 which is engageable with a stationary contact 50. A rod 51 carried by the switch arm is equipped with an armature 52 which confronts the pole piece 53 of an electro-magnet 54.

In wiring the device a battery 55 is connected by a wire 56 to a binding post 57 on the casing, as shown in Figure 6. The binding post is connected by a wire 58 to the switch contact 34 of the switch arm 31 and said switch contact is connected by a wire 59 to the contact 49 of the companion switch arm 32, the stationary switch contact 50 of which is connected by a wire 60 to the switch contact 35 of the switch arm 31. The stationary switch contact 38 is connected by a wire 61 to a binding post 62 on the casing and the binding post is connected by a wire 63 to the right signal lamp 64. When a turn is being made without previous warning the rotating worm shaft 18 swings the cam 30 to move the switch arm 31 to circuit closing position at the contacts 34 and 35 and to open circuit position at the contact 39. Then a circuit may be traced from the battery to the wire 56, wire 58, wire 59, contact 49, contact 50, wire 60, contacts 35 and 38, wire 61, and wire 63 to the right signal lamp. This circuit is automatically broken by retrograde movement of the worm shaft when the turn has been completed.

However, when it is desired to give a warning in advance, the steering wheel is given a decided turn and then straightened out again, this movement of the wheel moving the cam 30 to swing the signal arm 31 as above described.

However, the electro-magnet 44 will now come into play as follows.

Associated with the clutch pedal is a switch 65, and associated with the brake pedal is a switch 66, as best shown in Figure 6. When the clutch switch is closed the brake pedal switch is opened, and vice versa. Both switches are connected by a wire 67 to the binding post 68 on the casing and the latter is connected by a wire 69 to one end of the coil of the electro-magnet 44, the other end of the coil being connected by a wire 70 to the stationary switch contact 37 associated with the switch arm 31.

Some distance from the intended turn the driver will depress the clutch pedal to drift up to the turn and this movement closes the switch 65 thereby, assuming that the quick jerk of the wheel has already set the switch arm 31, a circuit will also be closed through the electro-magnet which attracts the armature 42 and holds the arm in circuit closing position so that the circuit as above traced, to the right signal lamp will remain energized while the vehicle is drifting up to make the turn.

Now, as the driver depresses the brake pedal to make the turn, after depressing the brake pedal the switch 66 will maintain the circuit through the solenoid closed. The driver at this time will be in the initial stages of making the turn so consequently the cam 30 will hold the switch arm 31 in circuit closing position to maintain the circuit closed until the turn is made. When the turn is completed, the circuit through the electro-magnet having been previously broken, the worm 18 will move the cam 30 to its normal neutral position as the vehicle straightens out on the new course, thereby breaking the circuit to the right signal lamp at the contacts 35 and 38.

The wiring of the switch contacts of the companion switch arm 32, as well as the electro-magnet 54, is a duplicate of the wiring above described and for the purpose of clearness it is not thought necessary to describe the wiring since the energizing of the left signal lamp 71 is controlled by movement of the cam 30 to swing the switch arm 32 in the manner above described in connection with the operation of the switch arm 31.

A switch 72 is disposed on the tie rod of the steering mechanism. A wire 73 connects the switch with the battery 55. A wire 74 connects the switch with a binding post 75 on the casing. The binding post is connected by a wire 76 to the contact 35 of the switch arm 31. Each time the tie rod switch 72 is closed a circuit may be traced from the battery to the wire 73, wire 74, wire 76, contact 35, contact 38, wire 61, and wire 63 to the right signal lamp 64.

The purpose of the switch is as follows. Any movement of the steering wheels that does not intend a turn out of the line of direction, such as a right or left turn, will not cause a signal because the switch 72 is in open circuit. When the wheels are turned out of line, as when turning out of line to pass another car going in the same direction, or while the vehicle is making an intended turn, without having used the brake or clutch pedal, the circuit to the switch 72 is closed and at no other time.

From the above description it is thought that the construction and operation of the invention will be fully understood without further explanation.

What is claimed is:

In a turn signal switch for steering wheels, a casing adapted to be attached to a steering column, a worm shaft in the casing, means connecting the shaft to be rotated by the steering wheel when the steering wheel is turned, a traveling nut on the shaft, a rod swivelly and slidably secured to the nut, said rod terminating in a cam, a pair of parallel switch arms disposed on opposite sides of the cam and movable by the cam according to the direction of travel of the nut on the shaft, spaced switch contacts on one side of each arm, stationary switch contacts cooperating with said spaced switch contacts, a single switch contact on the other side of each arm, a stationary contact cooperating with the last named contact, each switch arm having an armature, and a respective electro-magnet for attracting each armature to hold the spaced switch contacts in circuit closing position and hold the single switch contact in open circuit position.

HARRY E. CITTELL.